United States Patent Office 3,787,592
Patented Jan. 22, 1974

1

3,787,592
FIXED VOLATILE FLAVORS AND METHOD
FOR MAKING SAME
William Alexander Mitchell, Lincoln Park, N.J., and Howard Dave Stahl, Tarrytown, and William Charles Seidel, Monsey, N.Y., assignors to General Foods Corporation, White Plains, N.Y.
No Drawing. Filed May 12, 1970, Ser. No. 36,666
Int. Cl. A23l 1/26
U.S. Cl. 426—380    11 Claims

ABSTRACT OF THE DISCLOSURE

Volatile flavoring compounds such as acetaldehyde are fixed in low amounts by having the compound present in solution during the crystallization of such edible materials as sucrose, mannitol, and sodium chloride. It is believed that the volatile flavors are entrapped as impurities within the crystal structure. The resulting compositions have excellent stability over a wide range of humidities, are soluble in both hot and cold water, and have application as flavor and aroma modifiers for foods.

BACKGROUND OF THE INVENTION

This invention relates to volatile food flavoring compounds such as flavors, flavor enhancers, aromas, and aroma enhancers, and more particularly to volatile flavoring compounds such as acetaldehyde, fixed in crystalline food materials such as sucrose to form solid flavoring compositions which are stable under normal shelf storage conditions, but which release flavoring when combined with either hot or cold water.

It has been known for some time that flavoring compounds such as acetaldehyde are important flavor components of natural fruits and vegetables and serve as flavor enhancers for the various flavor notes naturally present in meats, fruits and vegetables. Particularly, it has been found that acetaldehyde is very important in increasing the impact and freshness of certain flavors, such as fruit-type flavors. However, while the presence of acetaldehyde would be a valuable enhancer to a synthetic flavoring composition for use with a food formulation employing fruity-type flavors, it is difficult to incorporate acetaldehyde into a stable, solid flavor fixative. Most attempts to fix acetaldehyde in various compositions have tended to be unstable in the presence of small amounts of water or water vapor. This stability problem was apparent when powdered dessert and beverage products containing the fixed acetaldehyde was processed or packaged in a manner allowing atmospheric or product moisture to reach the fixed acetaldehyde during storage of the product. This problem is particularly acute when a fruit-type dessert or beverage formulation using a fixed acetaldehyde flavor is packaged in dry form in a non-hermetically sealed paper envelope or container which is sufficiently pervious to allow atmospheric moisture to enter and react with or dissolve the acetaldehyde.

Acetaldehyde is chemically very reactive; it is very soluble in water; and it has a low boiling point (21° C.). It exists as a gas at normal room temperature and pressure. It, furthermore, is readily oxidized to form acetic acid, and it easily polymerizes to form paraldehyde and metaldehyde. Thus, the problem confronting the food industry in augmenting the flavor and aroma of dry powdered mixes has been that of "fixing" acetaldehyde in a sufficiently stable state to avoid volatilization and/or chemical reaction during storage. It also is necessary to limit the degree of fixation to permit the release of the acetaldehyde compound during the normal household preparation of rehydrating or otherwise preparing a finished table product from the powdered mix (e.g. by addition of either hot or cold water).

Generally speaking, there are two methods of "fixing" acetaldehyde to insure improvement in shelf stability. One method is to chemically react the acetaldehyde with another material to form a more stable compound. The second method is to physically entrap or coat the acetaldehyde with a stable compound such as sugar, gum or other edible material.

With respect to the first method—that of forming a more stable compound—the resulting composition must not only have a degree of stability and dissociability compatible with storage and subsequent use conditions, but it must also be a functional derivative type compound; that is, it must have an inherent chemical structure which will release acetaldehyde upon decomposition. Also the residual decomposition compound other than the acetaldehyde resulting from the breakdown of the functional derivative compound must not be detrimental to the quality of the finished food product. It is also essential that the breakdown take place under the conditions at which the food product is prepared or used.

Although many attempts, such as U.S. Pat. No. 2,305,621, have been made to produce suitable functional derivative compounds by reacting acetaldehyde with other chemical compounds, with few exceptions, they have not resulted in operational successes. The major causes of the failures have been instability of the resulting product or, conversely, too great a stability to provide utility.

The second method of physically encapsulating the acetaldehyde within a stable compound has not usually met with commercial success since the products prepared by this method have been in a glassy or amorphous state and have tended to lose their fixed flavor during storage especially in the presence of moisture.

A recently issued U.S. patent to Dame et al., No. 3,314,803 discloses a method of fixing acetaldehyde by encapsulating the acetaldehyde in a matrix of dry mannitol. This procedure has produced a dry, non-hydroscopic material which will retain a portion of its fixed acetaldehyde even under non-hermetic conditions, but has the disadvantage of being very costly because of the current price of mannitol. The spray-dried, mannitol-acetaldehyde composition of Dame et al., can have an initial fixation of 2% to 10% by weight of acetaldehyde. However, this initial fix will be modulated in several days and the level of acetaldehyde will equilibrate to a stable range usually between 1% to 3%.

Generally, the prior art has indicated that in order to preserve flavor materials out of contact with the atmosphere, fixation should be achieved by means of amorphous matrix material. U.S. Pat. No. 2,856,291 to Schultz discloses that crystallization should be avoided since the crystal structure will enable the escape of the flavor materials or the permeation of the atmosphere into the flavoring composition through the interstices of the crystal structure. The Dame et al., patent discloses encapsulating the acetaldehyde within the mannitol matrix without crystallizing the mannitol.

SUMMARY OF THE INVENTION

According to the instant invention a stable fix for such volatile flavor compounds as acetaldehyde has been achieved by means of crystallizing an edible material such as sucrose from a solution containing the flavor compound. It has been discovered that small amounts of volatile flavoring materials can be fixed in crystalline materials in such a manner that the volatile material will be permanently fixed when stored under hermetic conditions and will retain much of the volatile material even after prolonged storage under non-hermetic conditions.

It is the general object of this invention to produce a moisture-stable flavoring material containing volatile flavoring compounds.

It is a further object of this invention to provide a non-hygroscopic, solid flavoring composition containing low (less than 1% by weight) amounts of a volatile flavoring compound which composition is capable of being mixed with powdered, fruit flavor mixes and which upon the addition of either hot or cold water during home preparation will enhance the flavor or aroma of a food product.

It is a specific object of this invention to produce a dry, non-hygroscopic, acetaldehyde - containing composition which will retain acetaldehyde under conditions of both elevated temperature and humidity.

It is a more specific object of this invention to entrap low (less than 1%) levels of acetaldehyde within the crystals of edible carbohydrate materials such as sucrose and mannitol.

It is a most specific object of this invention to produce a powdered food composition containing a high portion of sucrose and which sucrose has entrapped within its crystal structure a low (less than 1%) level of a volatile flavor compound such as acetaldehyde.

DESCRIPTION OF THE INVENTION

This invention is based on the discovery that volatile flavoring compounds such as acetaldehyde can be fixed within crystals of edible materials such as the carbohydrates at levels usually about 0.1% to 0.5% by weight and normally at a level of about 0.2%. It is believed that the volatile compound is fixed as an impurity within the crystals, as the crystals are formed in a mother liquor. This fixation is thought to be akin to what are known as crystal inclusions.

Since the amount of volatile flavor that can be fixed by the method of this invention is relatively low, it is contemplated that the commercial use of this invention would employ a fixing material which is an integral part of a food product. Sucrose is an example of a material which can be employed in this invention and which is a normal component of many fruit flavored powdered food products such as gelatin dessert and beverage mixes. The use of such a material as sucrose to also act as a fixing medium for a food flavoring compound such as acetaldehyde will permit the production of an improved food product with very little increase in the cost of raw materials. Sodium chloride is another crystalline material which is often used in large quantities in many foods (e.g. meats) and which can be used to fix volatile flavors (e.g. smoked flavors) according to this invention.

It is also contemplated by this invention that the entrapment of the volatile flavoring compound within sucrose crystals may be accomplished during the crystallization step of the sugar refining operation. This would avoid the necessity of performing a subsequent crystallization operation during the manufacture of the food product.

Another advantage of our invention is that crystalline fixations of acetaldehyde have been found to possess a clean acetaldehyde taste, quite free of the paraldehyde taste. This occurs despite the fact that the acetaldehyde source contains significant amounts of paraldehyde. It seems that this method of fixation fixes only the acetaldehyde while rejecting paraldehyde.

This invention is especially suited to fix those flavor compounds which are gaseous or which sublime at normal room conditions.

As previously indicated it is believed that the volatile compound is thought to be fixed by means of crystal inclusion. An inclusion may be thought of as foreign matter which is imbedded in the crystal structure and not merely located on the surface of the crystal. The material fixed within the crystals cannot be washed out and tends to remain permanently fixed until the crystal structure is destroyed. It has been found that the volatile flavors fixed in accordance with this invention are in fact unable to be washed out of the crystals and also that the crystalline fixations are able to be heated up to temperatures of at least 100° C. without appreciable loss of the volatile compound.

The mechanism by which the volatile flavor compounds are occluded within the crystal structure of fixing material during crystallization is thought to be approximated by a molecular model having a molecule of the flavor compound surrounded by a crystal cage consisting of a plurality of molecules of the fixing material. This mechanism is seen to differ from the inclusion complexes, exemplified by U.S. Pat. No. 3,061,444 to Rogers et al., where a molecule of the included compound is spatially fitted into a molecule of a cylindrical or spiral shaped dextrin material.

Sugar and sugar derivatives such as sucrose and mannitol are two examples of crystal forming carbohydrate materials that are successful in this invention. Other materials which form the appropriate crystal structure may also be employed in this invention. For instance, successful results can be obtained from crystallizing an aqueous solution of an inorganic salt such as sodium chloride or an organic acid such as fumaric acid with acetaldehyde.

Not all crystal producing materials have been found to produce successful products. Carbohydrates such as dextrose and lactose which form crystal hydrates have been found to fix only very small traces of volatile flavoring compounds, such as acetaldehyde, and are not considered to be acceptable. The reason why these crystal hydrates are unable to fix significant amounts of volatile flavoring compounds is not completely understood; however, it is observed that the volatile compounds do not effect the rate of crystallization of such materials. This is in contrast to the formation of anhydrous crystals of such materials as sucrose and mannitol where the volatile compounds are seen to inhibit crystallization and where it is thought that the crystals grow around the foreign material to form crystal inclusions.

The crystallization method used to produce the products of this invention comprises the formation of a supersaturated solution, preferably an aqueous solution, of the crystallizable material, usually at a temperature which is below the boiling point of the volatile compound. The volatile compound is then added to the supersaturated solution, and crystallization is allowed to proceed.

Usually a small amount of seed material is added to the supersaturated solution in order to initiate crystallization. The crystals thus obtained are separated and dried.

The crystallization step may also proceed under vacuum conditions where surprisingly it has been found that the fixation levels of such volatile compounds as acetaldehyde is equal to or better than the fix levels under atmospheric processing. In practice a vacuum crystallization step would be highly desirable since the crystallization time would be shortened and since a large portion of the water will be removed under the vacuum conditions.

This invention is further illustrated by, but not limited to, the following examples:

EXAMPLE I

A sucrose-water mixture of 539 grams of sucrose and 161 grams of water were heated until all of the sucrose dissolved. The solution was then cooled to below the boiling point of acetaldehyde (21° C.), or as in the case to 10° C., producing a supersaturated solution of sucrose. Twenty-one mililiters of acetaldehyde (16.5 grams) were added slowly with stirring. One gram of powdered sucrose was added to initiate crystallization. The mixture was allowed to crystallize for two days although less time may have been adequate.

After crystallization was complete, the mixture appeared white and seemed to have dropped in viscosity. Crystals could be felt in the syrup. The mixture was added to the basket of an International Chemical Centrifuge Model 367-H which was spinning at high speed. The crystals were retained by the basket while the syrup passed through. The filter cake was removed from the basket and powdered by passing through a No. 30 U.S. mesh screen. The crystals were allowed to dry over night. This procedure yielded 200 grams of crystalline sucrose or 37.1% of the starting material. These crystals were analyzed by a polarographic procedure and found to contain 0.135% acetaldehyde. Organoleptically, the sucrose was found to have a clean acetaldehyde taste even though the original acetaldehyde contained significant amounts of paraldehyde and did not have a clean taste.

The syrup obtained by centrifugation was saturated with sucrose and contained significant amounts of acetaldehyde. Additional sucrose may be added to the syrup and the mixture heated to obtain a solution of approximately 72% sucrose. Upon cooling the solution to below 21° C. additional acetaldehyde is added to produce a solution of approximately 2.3% acetaldehyde. The crystallization and centrifugation procedure are similar to those given above. In this manner, the total process may be considered cyclic and almost 100% efficient.

EXAMPLE II

Ten grams of mannitol were dissolved in 55 ml. water at room temperature. To this solution were added 1.9 ml. acetaldehyde. Thirty grams of mannitol were dissolved in 30 ml. water by heating. This solution was added to the solution containing acetaldehyde. The total solution now consisted of 40 grams of mannitol, 85 ml. water, and 1.9 ml. acetaldehyde. Upon cooling the solution began to get viscous and milky in appearance. After about an hour and a half, crystalization was completed. The mannitol crystals were filtered and air dried. Organoleptically, the mannitol was found to have a clean aceltaldehyde taste. The material was analyzed and found to contain about 0.16% acetaldehyde.

EXAMPLE III

Ten grams of mannitol were dissolved in 55 ml. of water at room temperature. To this solution was added 19 ml. of acetaldehyde. Fifty grams of mannitol were then dissolved in 50 ml. of water by heating. The two solutions were then combined and placed in a vacuum desiccator where a vacuum of 150 mm. of Hg was quickly achieved. After most of the water had been removed (about 60 minutes), the mannitol crystals were removed from the desiccator and air dried. The fix level of acetaldehyde was found to be 0.48%.

The material of Example I containing 0.135% acetaldehyde was evaluated for stability by packaging 7 grams of the sucrose fixed acetaldehyde (containing about 9.45 mg. of acetaldehyde) together with 85 grams of a standard-type gelatin dessert having a composition of:

| Ingredients: | Parts by weight |
| --- | --- |
| Sugar | 80.0 |
| Gelatin | 10.0 |
| Citric acid | 3.0 |
| Trisodium citrate | 1.2 |
| Fruit flavor | 0.6 |
| Fruit color | 0.2 |

The packages were wax-paper polyethylene laminate pouches which are heat sealed and placed into small paper containers. Individual packages were stored at 90° F./85% R.H. or 90° F./70% R.H. and periodically removed and analyzed for acetaldehyde using a polarograph.

TABLE

| R.H. at 90° F., percent | Days storage | Percent loss of acetaldehyde |
| --- | --- | --- |
| 70 | 8 | 0 |
| 85 | 8 | 0 |
| 70 | 42 | 2 |
| 85 | 42 | 7 |
| 70 | 120 | 46 |
| 85 | 120 | 42 |

The stability data is quantitatively only an approximation since due to imperfect blending not all samples analyzed are identical to the composition of the overall package. Qualitatively, however, both 8-day samples were found to be free flowing with no signs of caking and to have a clean acetaldehyde taste. The 42-day sample stored at 85% R.H. was somewhat caked but had a clean acetaldehyde taste; whereas, the 70% R.H. sample showed only slight signs of caking and possessed a clean acetaldehyde taste.

Evaluation of additional anhydrous crystalline material has shown that organic crystals such as fumaric acid and inorganic crystals such as sodium chloride are able to fix low levels (less than 1%) of clean acetaldehyde. Additionally, such volatile flavoring substances such as maltol, and natural and synthetic roasted coffee aromas (e.g. synthetic grinder gas and the like) have been successfully fixed within sucrose crystals.

It will be apparent that there are variations and modifications of this invention, and that the examples and typical operating conditions may be varied without departing from the scope of the invention.

Having thus described the invention, what is claimed is:

1. A method for producing a solid flavoring composition containing low levels of volatile flavoring compounds comprising the steps of:
    (a) forming a supersaturated aqueous solution of sucrose, said solution also containing a volatile flavoring compound,
    (b) crystallizing sucrose from the solution to fix a portion of the volatile flavoring compound within individual sucrose crystals at a level of from about 0.1% to about 0.5% by weight of the crystal, and thereafter,
    (c) drying the crystals.

2. The method of claim 1 wherein the crystals are separated from solution and then dried.

3. The method of claim 2 wherein the volatile flavoring compound is acetaldehyde.

4. The method of claim 1 wherein seed material is added to the supersaturated solution in order to initiate crystallization.

5. The method of claim 4 wherein the crystals are separated from the solution and then dried.

6. The method according to claim 5 wherein the crystallization takes place under vacuum conditions.

7. The method according to claim 6 wherein the volatile flavoring compound is acetaldehyde.

8. A solid moisture-stable flavoring composition comprising sucrose food crystals containing from about 0.1% to about 0.5% by weight of a volatile flavoring compound fixed within its crystal structure.

9. The flavoring composition of claim 8 wherein the volatile flavoring material is acetaldehyde.

10. The flavoring composition of claim 9 wherein the composition is incorporated into a powdered gelatin dessert mix.

11. The flavoring composition of claim 9 wherein the flavoring composition is incorporated into a powdered beverage mix.

References Cited
UNITED STATES PATENTS

| | | | |
|---|---|---|---|
| 3,554,768 | 1/1971 | Feldman | 99—140 R |
| 3,480,444 | 11/1969 | Mitchell et al. | 99—140 R |
| 2,854,343 | 9/1958 | Strashon et al. | 99—140 R |
| 2,786,766 | 3/1957 | Meusel | 99—140 R |
| 3,314,803 | 4/1967 | Dame et al. | 99—140 |

MORRIS O. WOLK, Primary Examiner

S. MARANTZ, Assistant Examiner

U.S. Cl. X.R.

426—422, 442, 456